H. M. DAKE.

Portable Fence.

No. 8,152. Reissued April 2, 1878.

WITNESSES

Franck L. Durand.

Frank Gatt

INVENTOR

H. M. Dake.

N. PETERS, PHOTO-LITHOGRAPHER, WASHINGTON, D. C.

UNITED STATES PATENT OFFICE.

HORACE M. DAKE, OF NUNDA, NEW YORK.

IMPROVEMENT IN PORTABLE FENCES.

Specification forming part of Letters Patent No. 136,217, dated February 25, 1873; Reissue No. 8,152, dated April 2, 1878; application filed March 27, 1878.

*To all whom it may concern:*

Be it known that I, HORACE M. DAKE, of Nunda, in the county of Livingston and State of New York, have invented certain new and useful Improvements in Portable Fences; and I do hereby declare that the following is a full, clear, and exact description thereof, reference being had to the annexed drawing, and to the letters of reference marked thereon, which form a part of this specification.

The nature of my invention consists in the construction and arrangement of a movable fence, as will be hereinafter more fully set forth.

In order to enable others skilled in the art to which my invention appertains make and use the same, I will now proceed to describe its construction and operation, referring to the annexed drawing, in which—

Figure 1:
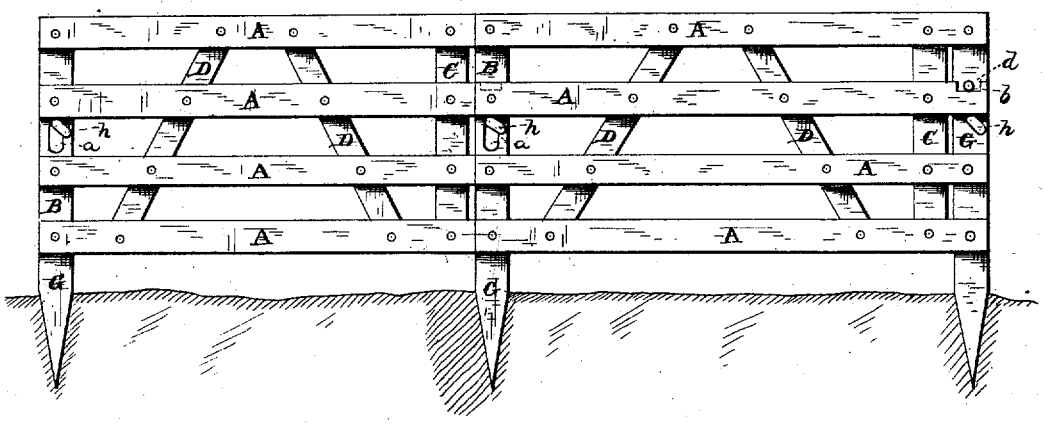
Figure 2:
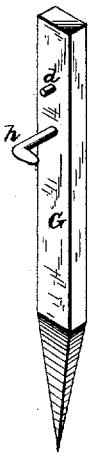

Figure 1 is a front elevation, showing two panels of my fence; and Fig. 2 is an enlarged perspective view of one of the fence-posts.

Each panel of my fence is composed of a series of horizontal boards, A A, nailed to two upright boards, B and C; and the panel is strengthened by oblique or inclined cross-pieces D D, enabling me to use longer panels than otherwise could be done and possess the necessary strength. The upright board or cross-piece B is nailed to the ends of the fence-boards A A, while the cross-piece C is nailed a short distance from the other ends. Immediately below one of the boards A, but neither the top nor bottom board, is made a vertical slot or mortise, *a*, in the cross-piece B, said slots or mortises to be at a uniform place in all the panels. In the upper edge of the same board A under which the slot *a* is made, but near the other end, is made a notch, *b*, about an inch deep and about four inches long.

G represents the fence-post, in which are fastened a pin, *d*, and a hook, *h*. The pin *d* should project no farther from the face of the post than the thickness of the fence-boards used. The hook *h* is made of hard wood or iron, and is fastened in the post as far below the pin *d* as the distance between the bottom of the notch *b* and the lower edge of the board in which the same is cut. The hook or turned part must be of uniform size and length in all the posts, and be turned in an inclined position, as shown. The shank of the hook should project from the face of the post a uniform distance—namely, as far as the combined thickness of the fence-board A and cross-piece B, measuring to the inside of the hook.

The mortises *a* are of sufficient length to slip readily over the turned part of the hook *h* when placed in proper position therefor.

When the posts G are set at equal distances apart to correspond with the length of the panel, and the pins *d* and hooks *h* are firmly fastened in the posts, as above described, then take one fence-panel, and by holding it in an inclined position the mortise *a* will slip over the hook *h*. Then, by letting the raised end of the panel down, the notch *b* is placed under the pin *d* of the next post, the bottom of the notched board resting on the shank of the hook in this post. The next panel, being put on in the same manner, locks the first, and so on till the fence is completed.

Having thus fully described my invention, what I claim as new, and desire to secure by Letters Patent, (reissued,) is—

The stake-post G, provided with hook *h* and pin *d*, mortised cross-piece B, and a portable panel, provided with notched board A, and vertical and inclined cross-pieces C and D, all constructed and arranged to form a portable fence, as and for the purposes specified.

In testimony that I claim the foregoing as my own I affix my signature in presence of two witnesses.

HORACE M. DAKE.

Witnesses:
JOSEPH ALLEN,
J. S. SHEDD.